US011689299B2

(12) United States Patent
Mochizuki

(10) Patent No.: US 11,689,299 B2
(45) Date of Patent: Jun. 27, 2023

(54) WIRELESS COMMUNICATION APPARATUS WITH CALIBRATION

(71) Applicant: NEC CORPORATION, Tokyo (JP)

(72) Inventor: Takuji Mochizuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 340 days.

(21) Appl. No.: 16/436,349

(22) Filed: Jun. 10, 2019

(65) Prior Publication Data

US 2019/0386751 A1 Dec. 19, 2019

(30) Foreign Application Priority Data

Jun. 13, 2018 (JP) .............................. JP2018-112820

(51) Int. Cl.
| | | |
|---|---|---|
| *H04B 17/12* | (2015.01) | |
| *H04W 76/34* | (2018.01) | |
| *H04B 17/336* | (2015.01) | |
| *H04W 72/0446* | (2023.01) | |
| *H04L 27/26* | (2006.01) | |
| *H04L 5/14* | (2006.01) | |

(52) U.S. Cl.
CPC ........... *H04B 17/12* (2015.01); *H04B 17/336* (2015.01); *H04L 5/1469* (2013.01); *H04L 27/2607* (2013.01); *H04W 72/0446* (2013.01); *H04W 76/34* (2018.02)

(58) Field of Classification Search
None
See application file for complete search history.

(56) References Cited

U.S. PATENT DOCUMENTS

| | | | | | |
|---|---|---|---|---|---|
| 4,052,567 | A | * | 10/1977 | MacKay | ................. G08C 15/06 370/458 |
| 6,615,024 | B1 | * | 9/2003 | Boros | ..................... H01Q 1/246 455/562.1 |
| 8,891,598 | B1 | * | 11/2014 | Wang | ................... H04B 7/0413 375/220 |

(Continued)

FOREIGN PATENT DOCUMENTS

| | | |
|---|---|---|
| JP | 2002-016515 A | 1/2002 |
| JP | 2002-520891 A | 7/2002 |

(Continued)

OTHER PUBLICATIONS

Kim et al. "Online Calibration for LTE-Based Antenna Array System", 2016, Hindawai Publishing, International Journal of Antennas and Propagation, vol. 2016, pp. 1-10, 2016 (Year: 2016).*

(Continued)

*Primary Examiner* — Noel R Beharry
*Assistant Examiner* — Rodrick Mak

(57) ABSTRACT

A wireless communication apparatus includes: a plurality of receivers provided so as to correspond to a plurality of respective antennas; a calibration transmitter; and a control unit configured to release, when a UL calibration is executed, connection between the antennas and the respective receivers, and determine a calibration weight to be applied to each of the receivers based on a UL calibration signal transmitted from the calibration transmitter and a UL calibration signal received by each of the receivers.

6 Claims, 10 Drawing Sheets

(56) References Cited

U.S. PATENT DOCUMENTS

| | | | | |
|---|---|---|---|---|
| 2005/0099936 | A1* | 5/2005 | Fujii | H04L 1/0007 370/203 |
| 2007/0009016 | A1* | 1/2007 | Tsutsui | H04B 7/0689 375/267 |
| 2008/0081671 | A1* | 4/2008 | Wang | H04L 25/0228 455/562.1 |
| 2012/0074952 | A1* | 3/2012 | Chappell | G01R 31/11 324/534 |
| 2012/0123723 | A1* | 5/2012 | El-Hassan | H04W 24/08 702/108 |
| 2014/0242914 | A1* | 8/2014 | Monroe | H04B 17/21 455/63.4 |
| 2014/0364067 | A1* | 12/2014 | Hsieh | H04B 17/21 455/226.1 |
| 2016/0020817 | A1* | 1/2016 | Chen | H04B 17/12 370/278 |
| 2016/0164124 | A1* | 6/2016 | Suh | H01M 8/04231 429/411 |
| 2017/0257137 | A1* | 9/2017 | Matsumura | H04B 17/14 |
| 2018/0048361 | A1* | 2/2018 | Kundargi | H04L 25/0224 |
| 2018/0212668 | A1* | 7/2018 | Athley | H04B 7/088 |
| 2018/0279311 | A1* | 9/2018 | Yoo | H04B 17/21 |
| 2019/0222406 | A1* | 7/2019 | Wang | H04L 25/0224 |

FOREIGN PATENT DOCUMENTS

| | | | |
|---|---|---|---|
| JP | 2004-023742 A | 1/2004 | |
| JP | 2006-253818 A | 9/2006 | |
| JP | 2017-212594 A | 11/2017 | |
| KR | 20120086329 A * | 8/2012 | H04B 17/14 |
| WO | 00/03456 A1 | 1/2000 | |

OTHER PUBLICATIONS

3GPP TS 36.104 V15.2.0 3rd Generation Partnership Project Technical Specification Group Radio Access Network Evolved Universal Terrestrial Radio Access (E-UTRA);Base Station (BS) radio transmission and reception (Release 15), (Mar. 2018), 279 pgs.

Japanese Office Action for JP Application No. 2013-112320 dated Mar. 15, 2022 with English Translation.

Japanese Office Action for JP Application No. 2018-112820 dated Sep. 6, 2022 with English Translation.

\* cited by examiner

WIRELESS COMMUNICATION APPARATUS WITH CALIBRATION

INCORPORATION BY REFERENCE

This application is based upon and claims the benefit of priority from Japanese patent application No. 2018-112820, filed on Jun. 13, 2018, the disclosure of which is incorporated herein in its entirety by reference.

TECHNICAL FIELD

The present disclosure relates to a wireless communication apparatus and a wireless communication method.

BACKGROUND ART

A Multi User-Multi Input Multi Output (MU-MIMO) function or a Massive MIMO function in which data is simultaneously transmitted to a plurality of radio terminals from antennas in which a large number of elements include independent transmitters/receivers has been known. Further, an Active Antenna System (AAS) equipped with the MU-MIMO function or the Massive MIMO function has been known, and it has been considered to adopt the AAS to a base station.

When the base station is operated in a Time Division Duplex (TDD) mode, in order to compensate and eliminate variations in the amplitude and the phase of transmitters/receivers connected to the plurality of antennas, it is required to execute transmitter/receiver calibration (Downlink (DL)/Uplink (UL) Calibration (CAL)) in the AAS (e.g., Patent Literature 1). Further, when the base station is operated for a long time, in order to compensate the difference in the variations in the amplitude and the phase between the transmitters/receivers due to outside temperature fluctuation or change over time, it is also important to perform calibration periodically and sequentially to remove this difference.

Further, the base station performs UL channel estimation (UL Ch estimation) regarding a channel (radio propagation path) with each of the terminals in a state in which the amplitude and the phases of all the transmitters/receivers are matched (compensated) after the execution of the calibration. Then the base station forms an antenna pattern for each terminal at the time of MU-MIMO by executing DL Beam Forming for each terminal by this channel estimation, and executes spatial multiplexing by forming Null in another terminal direction.

[Patent Literature 1] Published Japanese Translation of PCT International Publication for Patent Application, No. 2002-520891

If an interference wave from an external environment interferes when the UL calibration is executed, and when UL channel estimation is executed after the execution of the UL calibration, performance is degraded. When the interference wave from the external environment of AAS is received at the time of execution of the UL calibration, an error occurs in the amplitude and the phase of the whole reception period after the execution of the UL calibration, which causes degradation of the spatial multiplexing performance. Further, when the interference wave from the external environment is received when the UL channel is estimated after the execution of the UL calibration, an error occurs during the UL channel estimation, which causes degradation of the spatial multiplexing performance.

SUMMARY

The present disclosure has been made in order to solve the aforementioned problem, and one of the objects of the present disclosure is to provide a wireless communication apparatus and a wireless communication method capable of suppressing degradation of a spatial multiplexing performance.

A wireless communication apparatus according to a first aspect includes:
a plurality of receivers provided so as to correspond to a plurality of respective antennas;
a calibration transmitter; and
a control unit configured to release, when an Uplink (UL) calibration is executed, connection between the antennas and the respective receivers, and determine a calibration weight to be applied to each of the receivers based on a UL calibration signal transmitted from the calibration transmitter and a UL calibration signal received by each of the receivers.

A wireless communication apparatus according to a second aspect includes:
a plurality of receivers;
a determination unit configured to acquire a quality value of each of a plurality of reception signals received by the plurality of respective receivers and determine whether the transition of the quality value satisfies a first condition; and
a control unit configured to determine at least one of a calibration weight to be applied to each of the receivers based on reception signals received by the plurality of respective receivers and a UL channel estimation value between antennas that correspond to the respective receivers and a plurality of user equipments,
in which the control unit updates, for a receiver in which the transition of the quality value satisfies the first condition, the calibration weight and the UL channel estimation value to the calibration weight and the UL channel estimation value determined based on the reception signal received by the receiver before the transition of the quality value satisfies the first condition.

A wireless communication method according to a third aspect includes:
releasing, when UL calibration is executed, connection between a plurality of antennas and a plurality of respective receivers provided so as to correspond to the respective antennas; and
determining a calibration weight to be applied to each of the receivers based on a UL calibration signal transmitted from a calibration transmitter and a UL calibration signal received by each of the receivers.

BRIEF DESCRIPTION OF DRAWINGS

The above and other aspects, features and advantages of the present disclosure will become more apparent from the following description of certain exemplary embodiments when taken in conjunction with the accompanying drawings, in which.

EMBODIMENTS

Hereinafter, with reference to the drawings, example embodiments of the present disclosure will be explained. The following descriptions and the drawings are omitted and simplified as appropriate for the sake of clarity of description. Throughout the drawings, the same elements are denoted by the same reference symbols, and overlapping descriptions are omitted as appropriate.

First Example Embodiment

Figure 1:
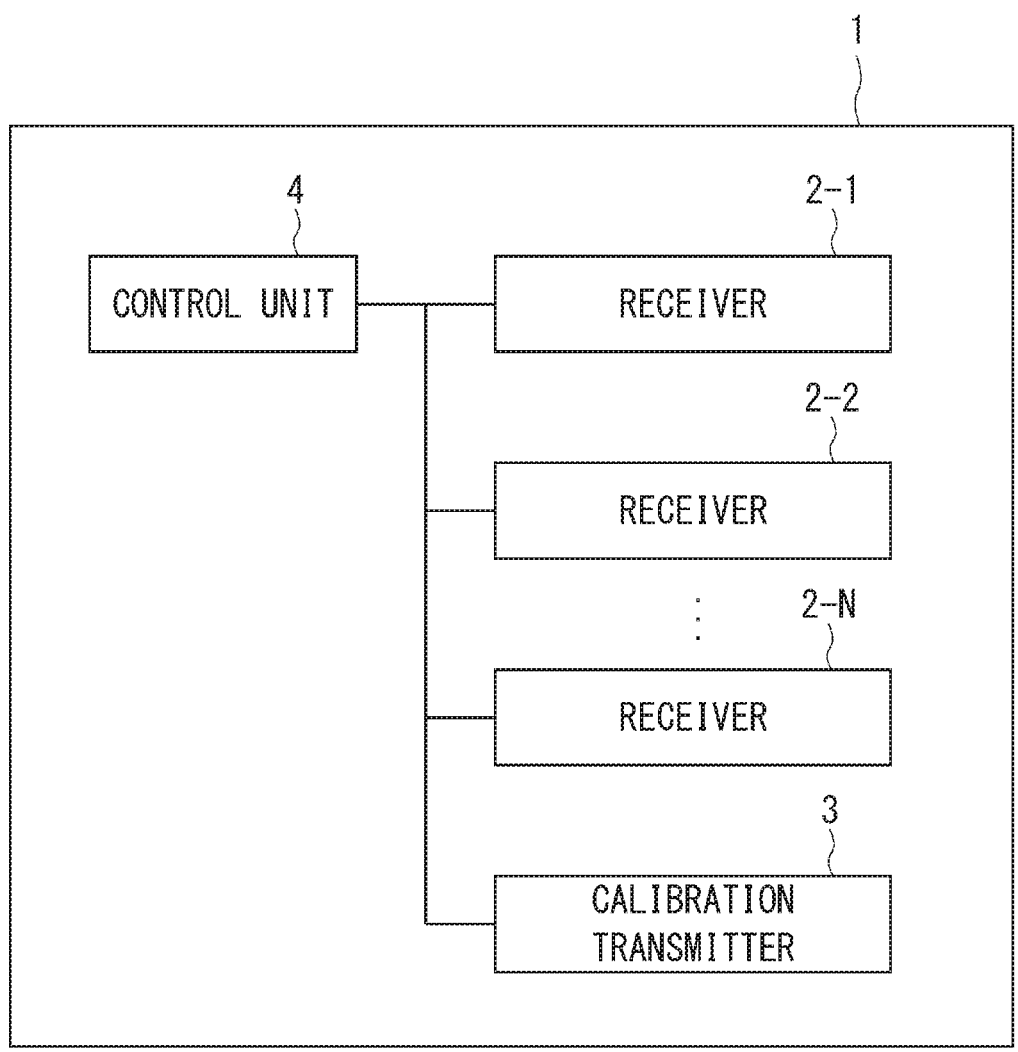
FIG. 1 is a diagram showing a schematic configuration example of a wireless communication apparatus according to a first example embodiment.

First, as a first example embodiment, the outline of example embodiments of the present disclosure will be explained. With reference to FIG. 1, a wireless communication apparatus 1 according to a first example embodiment will be explained. FIG. 1 is a diagram showing a schematic configuration example of the wireless communication apparatus according to the first example embodiment.

The wireless communication apparatus 1 may be an AAS that includes a plurality of antennas and a plurality of transmitters/receivers provided so as to correspond to the plurality of respective antennas. The wireless communication apparatus 1 includes receivers 2-1 to 2-N (N: a natural number equal to or larger than 2), a calibration transmitter 3, and a control unit 4.

The receivers 2-1 to 2-N are provided so as to correspond to the plurality of respective antennas (not shown), and are connected to the corresponding antennas. When the wireless communication apparatus 1 executes UL calibration as reception calibration, each of the receivers 2-1 to 2-N receives a UL calibration signal from the calibration transmitter 3. Each of the receivers 2-1 to 2-N converts the received UL calibration signal (RF signal) into a UL calibration signal (IQ signal) and outputs the UL calibration signal (IQ signal) to the control unit 4. The uplink UL denotes a communication path from a user equipment (UE) (not shown) to the wireless communication apparatus 1 and the downlink DL denotes a communication path from the wireless communication apparatus 1 to the UE.

The calibration transmitter 3 converts the UL calibration signal (IQ signal) transmitted from the control unit 4 into a UL calibration signal (RF signal) and transmits the UL calibration signal (RF signal) to the receivers 2-1 to 2-N.

When the UL calibration is executed, the control unit 4 releases connection of the receivers 2-1 to 2-N with the respective antennas that correspond to the respective receivers. Then the control unit 4 determines a calibration weight to be applied to each of the receivers 2-1 to 2-N based on the UL calibration signal (IQ signal) transmitted from the calibration transmitter 3 and the UL calibration signal (IQ signal) received by each of the receivers 2-1 to 2-N. The calibration weight, which is a weight for compensating the variations of the amplitude and the phases of the respective receivers, is determined by the UL calibration.

As described above, the control unit 4 according to the first example embodiment releases, when the UL calibration is executed, the connection between the receivers 2-1 to 2-N and the respective antennas that correspond to the receivers. That is, the control unit 4 performs control in such a way that the UL calibration signal received from each of the receivers 2-1 to 2-N does not include, for example, a radio interference source from another system or the like that exists in an external environment of the AAS. Then the control unit 4 determines the calibration weight to be applied to each of the receivers based on the UL calibration signal transmitted from the calibration transmitter 3 and the UL calibration signal received by each of the receivers 2-1 to 2-N. Therefore, according to the wireless communication apparatus 1 in the first example embodiment, even when the aforementioned radio interference source exists in the external environment of the AAS, it becomes possible to prevent the UL calibration signal from being degraded due to this radio interference source. Accordingly, by using the wireless communication apparatus 1 according to the first example embodiment, it becomes possible to prevent the spatial multiplexing performance from being reduced.

Second Example Embodiment

Figure 2:
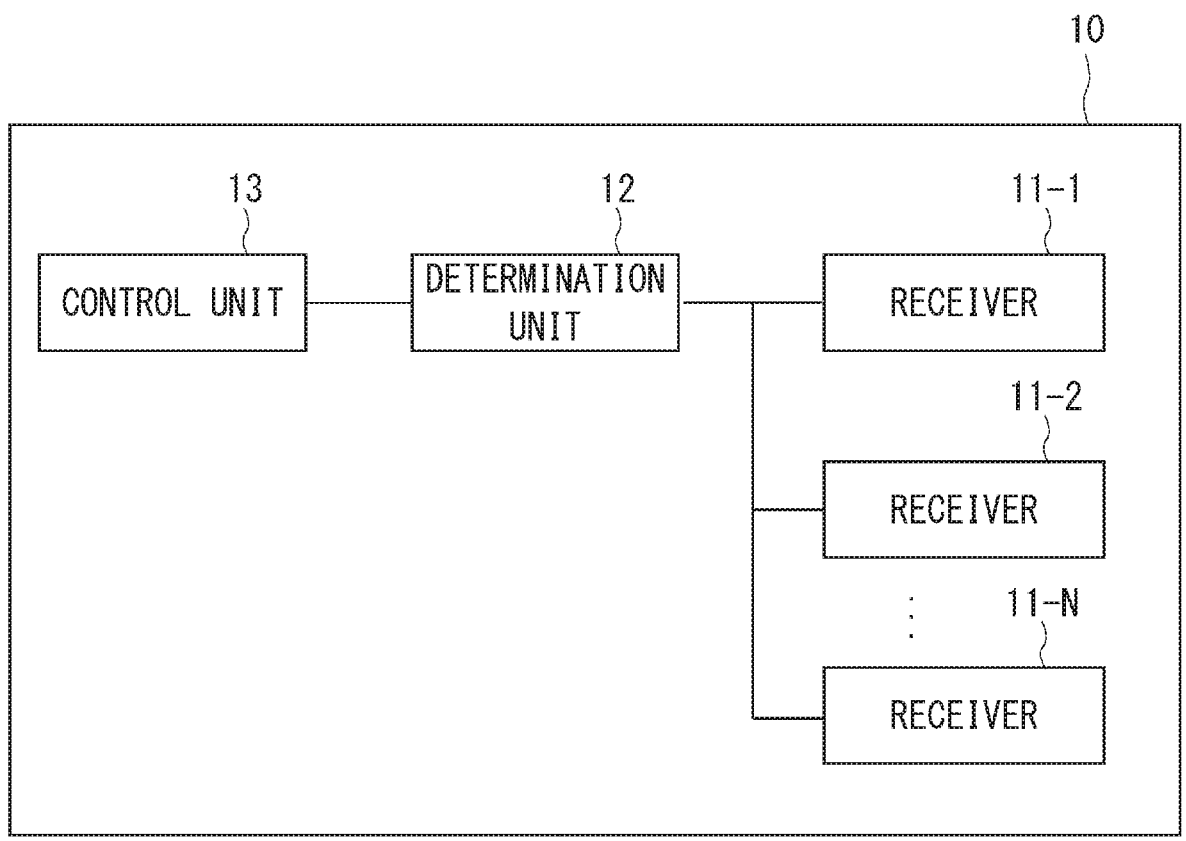
FIG. 2 is a diagram showing a schematic configuration example of a wireless communication apparatus according to a second example embodiment.

Next, as a second example embodiment, an outline of another example embodiment of the present disclosure will be explained. With reference to FIG. 2, a wireless communication apparatus 10 according to the second example embodiment will be explained. FIG. 2 is a diagram showing a schematic configuration example of the wireless communication apparatus according to the second example embodiment.

The wireless communication apparatus 10 may be an AAS, similar to the wireless communication apparatus 1 according to the first example embodiment. The wireless communication apparatus 10 includes receivers 11-1 to 11-N, a determination unit 12, and a control unit 13.

Since the receivers 11-1 to 11-N correspond to the receivers 2-1 to 2-N according to the first example embodiment and the configuration of the receivers 11-1 to 11-N is the same as that of the receivers 2-1 to 2-N, the descriptions thereof will be omitted in this example embodiment.

The determination unit 12 acquires quality values of the plurality of reception signals received by the respective receivers 11-1 to 11-N and determines whether the transition of each of the quality values satisfies a first condition. Each of the plurality of reception signals is a reception signal including at least one of the UL calibration signal and the UL channel estimation signal. The first condition is a condition for determining whether the reception signals received by the respective receivers are affected by interference from another system.

The control unit 13 determines at least one of the calibration weight applied to each of the receivers 11-1 to 11-N and the UL channel estimation value between the antennas that correspond to the respective receivers 11-1 to 11-N and the plurality of user equipments based on the reception signals received by the respective receivers 11-1 to 11-N. The calibration weight is determined by the UL calibration operation based on the UL calibration signal. Further, the control unit 13 updates, for a receiver in which the transition of the quality value satisfies the first condition, the calibration weight and the UL channel estimation value to the calibration weight and the UL channel estimation value determined based on the reception signal received by the receiver before the transition of the quality value satisfies the first condition.

As described above, the determination unit 12 according to the second example embodiment determines whether the reception signal satisfies the first condition based on the transition of the quality values of the plurality of reception signals received by the respective receivers 11-1 to 11-N. That is, the determination unit 12 determines whether the reception signal is affected by interference from another system. Then the control unit 13 updates, for a receiver in which the transition of the quality value of the reception signal satisfies the first condition, the calibration weight and the UL channel estimation value to the calibration weight and the UL channel estimation value determined based on the reception signal received by the receiver before the transition of the quality value of the reception signal satisfies the first condition. That is, the control unit 13 updates, for the receiver in which the reception signal is affected by interference from another system, the calibration weight and the UL channel estimation value to the calibration weight and the UL channel estimation value determined based on the reception signal in which it is estimated that it is not affected by interference from another system. Accordingly, according to the wireless communication apparatus 10 according to the second example embodiment, the results of the UL calibration and the UL channel estimation executed based on the signal in which it is determined that the interference wave from the external environment does not interfere are employed, whereby it becomes possible to suppress degradation of the spatial multiplexing performance.

Third Example Embodiment

Next, a third example embodiment will be explained. The third example embodiment is an example embodiment in which the first example embodiment is described in more detail. Prior to the description of the configuration example of a wireless communication apparatus 100 according to the third example embodiment, the outline of the UL calibration operation executed by the wireless communication apparatus 100 will be explained.
<UL Calibration Execution Timing>

Figure 3:
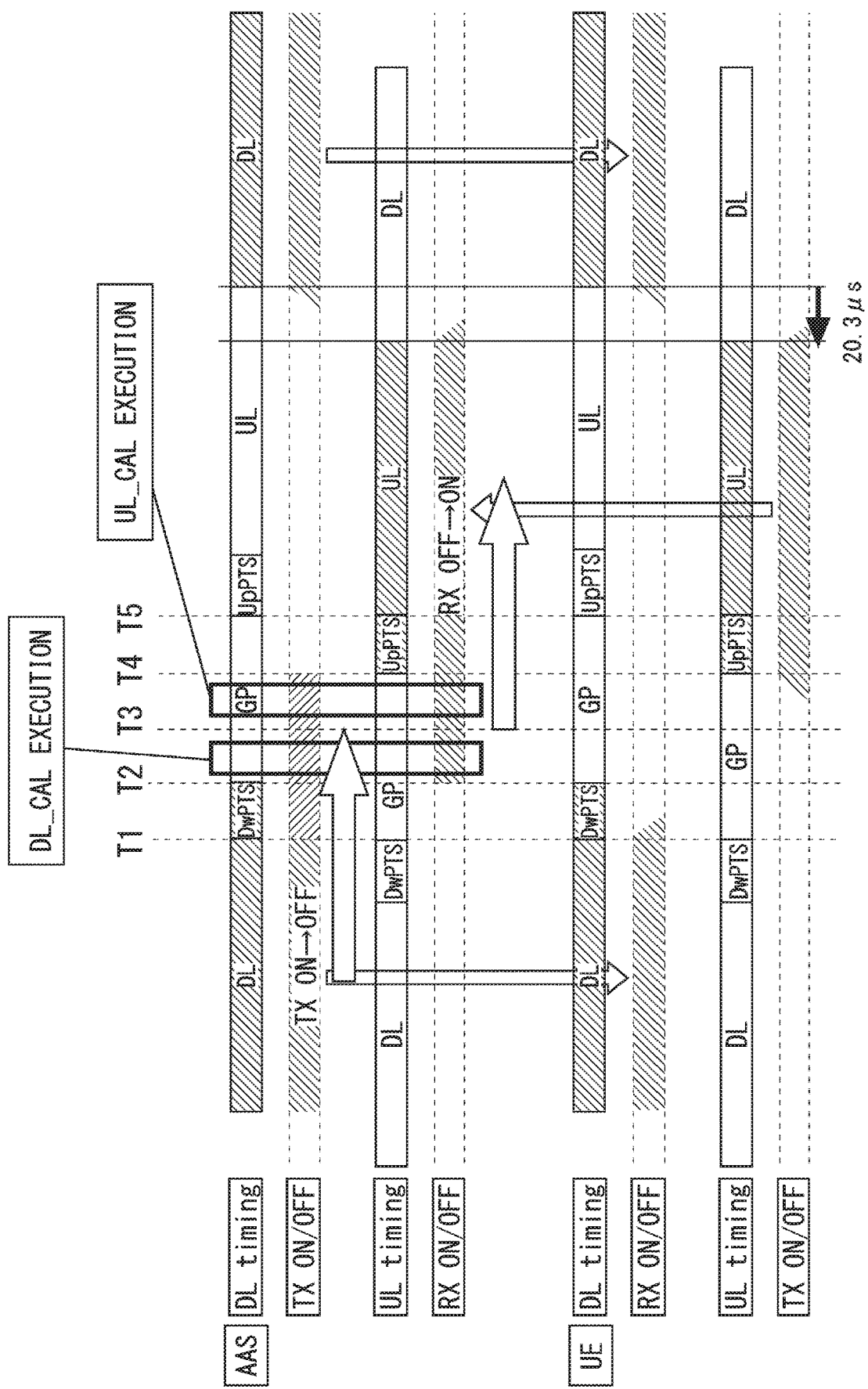
FIG. 3 is a diagram for describing a UL calibration execution timing.

Referring first to FIG. 3, a UL calibration execution timing will be explained. FIG. 3 is a diagram for describing the UL calibration execution timing.

As a premise, the wireless communication apparatus 100 according to the third example embodiment is a wireless communication apparatus that corresponds to the TDD mode (TDD communication system). The TDD mode is a communication system configured to transmit or receive data while temporally switching the DL communication and the UL communication using the same frequency in the uplink/downlink (UL/DL). A DL subframe is transmitted in the DL communication and a UL subframe is transmitted in the UL communication. Further, in a timing when the DL communication is switched to the UL communication, a special subframe is transmitted. The special subframe is a subframe formed of a Downlink Pilot Time Slot (DwPTS), a Guard Period (GP), and an Uplink Pilot Time Slot (UpPTS). The DwPTS is a field reserved for the DL communication. The UpPTS is a field reserved for the UL communication. The GP is a field in which neither the DL communication nor the UL communication is performed.

FIG. 3 shows, from top to bottom, time (T1-T5), the DL timing of the wireless communication apparatus 100, the ON or OFF state of the transmitter TX of the wireless communication apparatus 100, the UL timing, and the ON or OFF state of the receiver RX of the wireless communication apparatus 100. FIG. 3 further shows the DL timing of the UE that performs communication with the wireless communication apparatus 100, the ON state or the OFF state of the receiver RX of the UE, the UL timing, and the ON state or the OFF state of the transmitter TX of the UE. In FIG. 3, the wireless communication apparatus 100 is described as the AAS. The time indicates that time advances from T1 to T5 in this order. In other words, time passes starting from T1, and T5 indicates the latest time. The time sections of the DL communication, the DwPTS, the GP, the UpPTS, and the UL communication are shown for each of the DL timing and the UL timing. The time sections hatched by diagonal lines in the DL timing and the UL timing indicate the time sections allocated to the DL or the UL.

As shown in the DL timing of the wireless communication apparatus 100 shown in FIG. 3, the transmitter TX of the wireless communication apparatus 100 makes a transition from the ON state to the OFF state in the time section of DwPTS from time T1 to time T2. Further, the transmitter TX is completely in the OFF state at time T4 in the time section of GP from time T3 to time T5. Further, as shown in the UL timing of FIG. 3, at time T3, the receiver RX of the wireless communication apparatus 100 makes a transition from the OFF state to the ON state.

The period from time T2 to time T4 is a time section of GP in which neither DL communication nor UL communication is performed in both the DL timing and the UL timing. Both the TX and the RX are in the ON state in both the DL timing and the UL timing. The wireless communication apparatus 100 executes DL calibration in the time section of the GP in the special subframe and then executes the UL calibration.
<Regarding Transmitter Power Level when UL Calibration is Executed>

Figure 4:
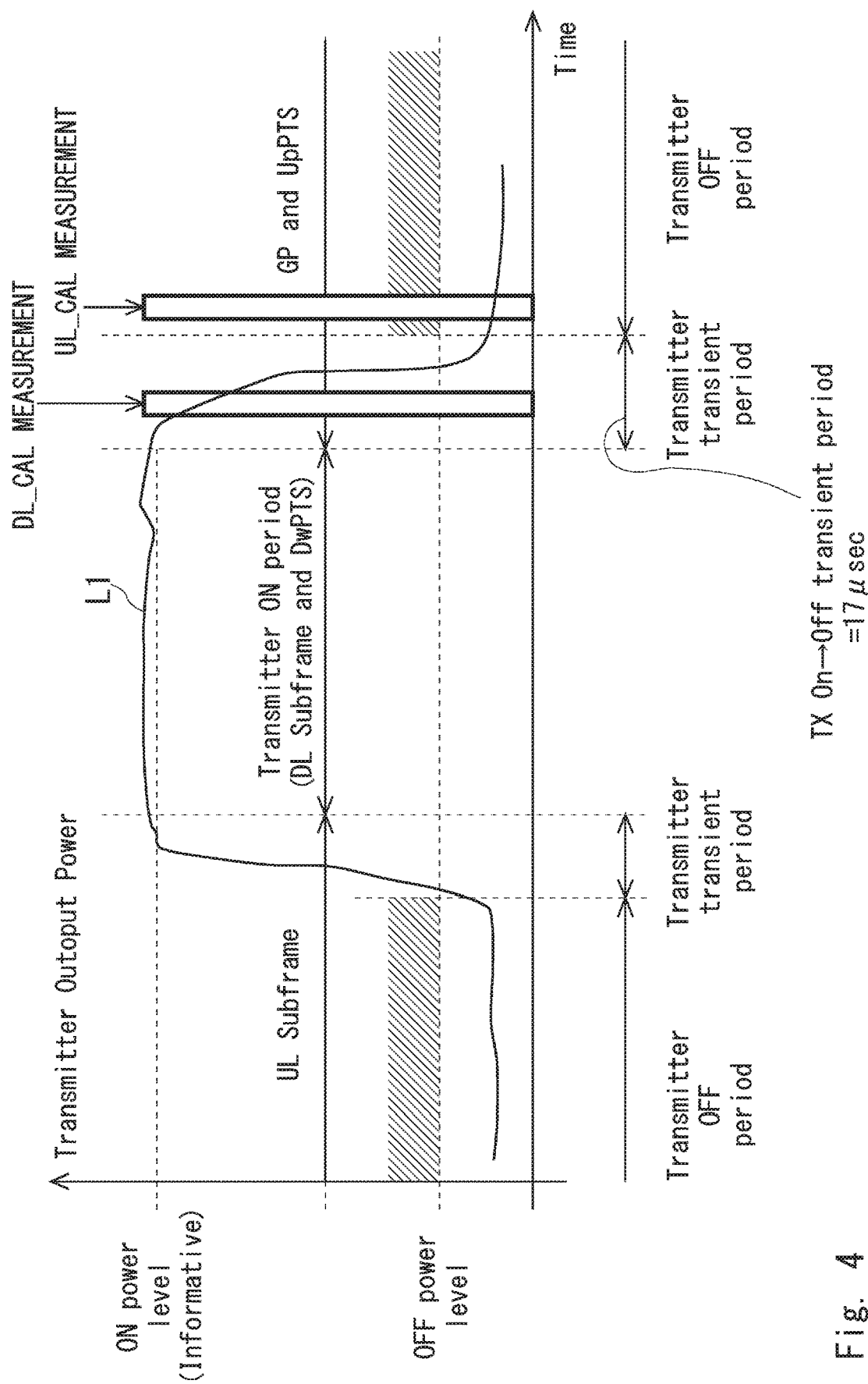
FIG. 4 is a diagram for describing a power level of a transmitter in a DL timing and a UL timing.

Referring next to FIG. 4, the power level of the transmitter TX in the UL timing of the wireless communication apparatus 100 will be explained. FIG. 4 is a diagram describing the power level of the transmitter in the DL and UL timings. Specifically, FIG. 4 shows the power level of the transmitter TX in each of the DL timing and the UL timing. In FIG. 4, the horizontal axis indicates time and the vertical axis indicates the power level. The solid line L1 shown in FIG. 4 shows the transition of the transmission power level of the transmitter TX of the wireless communication apparatus 100. The graph in FIG. 4 shows each of the DL timing and the UL timing, and the time section described as the UL subframe indicates that the UL communication is being performed. Further, the time sections described as the DL subframe and the DwPTS indicate the time sections of the DL communication and the DwPTS. Further, the time sections described as the GP and the UpPTS indicate the time sections of the GP and the UpPTS.

As described with reference to FIG. 3, the wireless communication apparatus 100 executes the DL calibration and the UL calibration in the time section of the GP in the special subframe. The time section in which the transmitter TX makes a transition from the ON state to the OFF state in the GP is defined to be 17 μsec in the 3GPP standards (TS36.104). Therefore, the wireless communication apparatus 100 executes the DL calibration in 17 μsec in which the transmitter TX makes a transition from the ON state to the OFF state.

Next, the wireless communication apparatus 100 executes the UL calibration in a state in which the transmitter TX has completely made a transition to the OFF state (after 17 μsec). In the 3GPP standards (TS36.104), when the transmitter TX is in the OFF state, the signal level needs to be −85 dBm/MHz or lower. That is, the wireless communication apparatus 100 needs to execute the UL calibration while keeping −85 dBm/MHz or lower. When the UL calibration is executed, the wireless communication apparatus 100 transmits the UL calibration signal, which is a signal for the UL calibration, to the wireless communication apparatus 100 and executes the same. When the signal level of the UL calibration signal is large, however, it is possible that the UL calibration signal may leak out from the antenna (ANT). Therefore, the wireless communication apparatus 100 sets the signal level of the UL calibration signal to be low. In this case, when the reception signal is affected by external interference wave reception interference (interference from another radio system such as WiFi (registered trademark)) from the ANT, the signal-to-interference-plus-noise ratio (SINR) of the UL calibration signal is significantly degraded.

In accordance with the above situation, if the UL calibration compensation is executed with interference degradation in the UL calibration signal, the amplitude and the phase compensation to each of the receivers cannot be performed appropriately. If UL channel estimation and the like are performed from each of the terminals in a situation in which the amplitude and the phases of all the receivers after the UL calibration are not matched, the beamforming pattern for each of the terminals to be determined and Null generation to be determined at the time of MU-MIMO end up to be degraded. In order to solve this problem, this example embodiment aims to suppress interference degradation in the UL calibration signal and to suppress degradation of the spatial multiplexing performance.

Hereinafter, details of the third example embodiment will be described.

<Configuration Example of Wireless Communication Apparatus>

Figure 5:
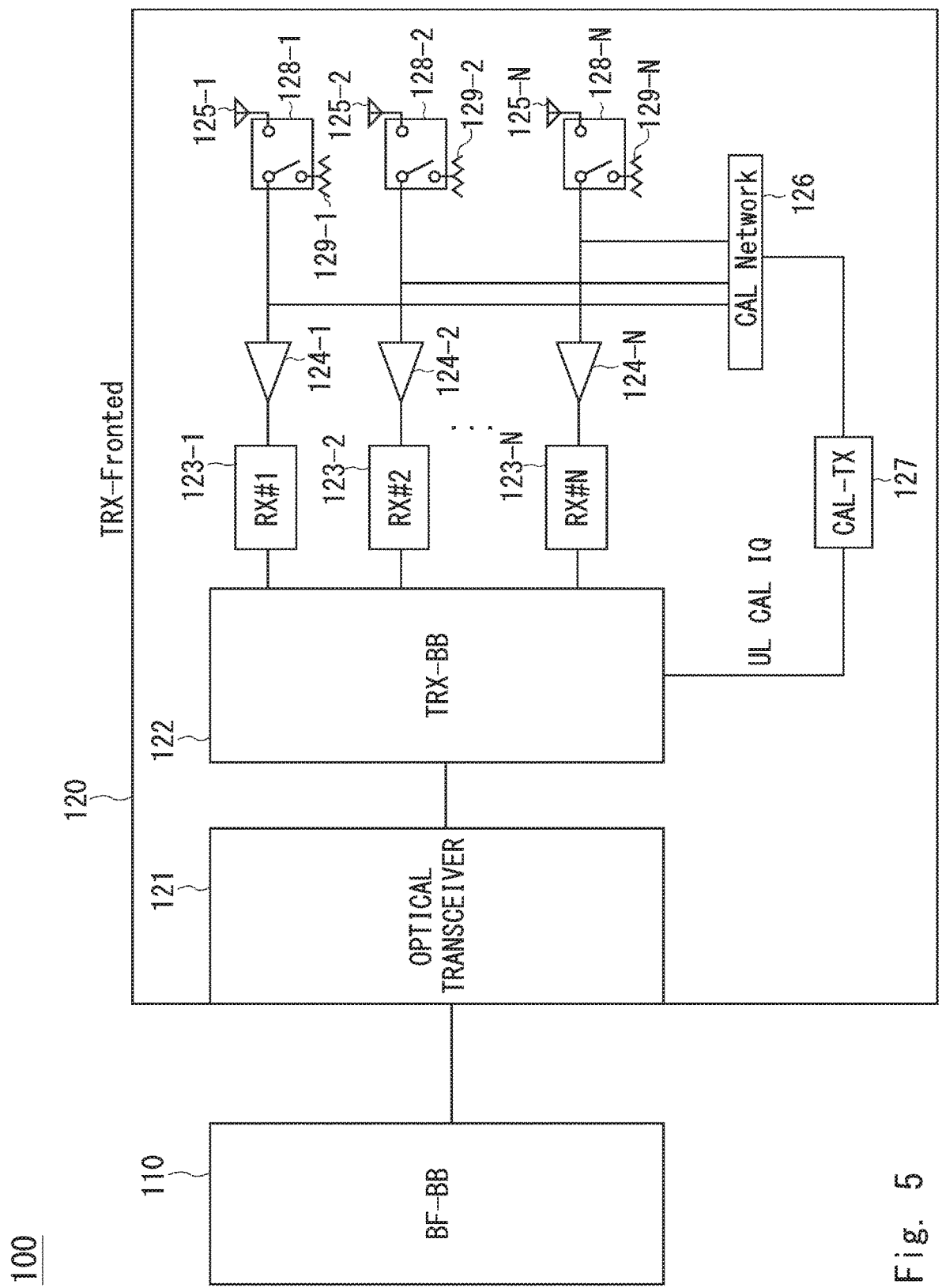
FIG. 5 is a diagram showing a configuration example of a wireless communication apparatus according to a third example embodiment.

With reference to FIG. 5, the wireless communication apparatus 100 according to the third example embodiment will be explained. FIG. 5 is a diagram showing a configuration example of the wireless communication apparatus according to the third example embodiment. The wireless communication apparatus 100 corresponds to the wireless communication apparatus 1 according to the first example embodiment. The wireless communication apparatus 100 may be the AAS, similar to the wireless communication apparatus 1 according to the first example embodiment.

As shown in FIG. 5, the wireless communication apparatus 100 includes a beamforming-baseband (BF-BB) unit 110 and a TRX-frontend unit 120.

The TRX-frontend unit 120 is a transmitter/receiver-frontend unit. The TRX-frontend unit 120 includes an optical transceiver 121, a transmitter/receiver baseband (TRX-BB) unit 122, and receivers (RXs) 123-1 to 123-N. The TRX-frontend unit 120 further includes amplifiers (AMPs) 124-1 to 124-N, antennas (ANTs) 125-1 to 125-N, a distributor 126, and a calibration transmitter (CAL-TX) 127. The TRX-frontend unit 120 further includes switches (SWs) 128-1 to 128-N and terminators 129-1 to 129-N.

In the following description, when there is no need to differentiate the RXs 123-1 to 123-N, the AMPs 124-1 to 124-N, and the ANTs 125-1 to 125-N, they are collectively referred to as an RX 123, an AMP 124, and an ANT 125. Further, when there is no need to differentiate the SWs 128-1 to 128-N and the terminators 129-1 to 129-N, they are collectively referred to as an SW 128 and a terminator 129. While FIG. 5 shows a configuration in which the wireless communication apparatus 100 includes only a function unit on a reception side for convenience of explanation, the wireless communication apparatus 100 may instead include a function unit on a transmission side.

The BF-BB unit 110 corresponds to the control unit 4 according to the first example embodiment. The BF-BB unit 110 is a baseband unit that has a function of generating a beamforming signal. The BF-BB unit 110 determines the calibration weight to be applied to each of the RXs 123 (UL CAL Weight) and stores this calibration weight periodically and when the wireless communication apparatus 100 is started. The calibration weight is determined by the UL calibration operation based on the UL calibration signal. The calibration weight to be applied to each of the RXs 123 is determined by RX #n×CAL-TX. Here, RX #n is reception system characteristics (the amplitude and the phase) of each of the RXs 123 and CAL-TX is common transmission system characteristics (the amplitude and the phase). A common transmission system is characteristics (the amplitude and the phase) of the CAL-TX 127.

When the BF-BB unit 110 executes the UL calibration, the BF-BB unit 110 transmits the UL calibration signal IQ to the CAL-TX 127 via the optical transceiver 121 and the TRX-BB unit 122. Further, the BF-BB unit 110 receives the UL calibration signal IQ from each of the RXs 123. The BF-BB unit 110 measures the difference between the amplitude and the phase of the UL calibration signal IQ transmitted from the CAL-TX 127 and the amplitude and the phase of the UL calibration signal IQ received by each of the RXs 123, and determines the calibration weight to be applied to each of the RXs 123.

Further, the BF-BB unit 110 controls each of the SWs 128. When the UL calibration is not executed, the state of each of the SWs 128 corresponds to a state in which the RXs 123 and the respective ANTs 125 are connected to each other. When the UL calibration is executed, the BF-BB unit 110 controls each of the SWs 128 in such a way as to connect the RXs 123 and the respective terminators 129. In other words, when the UL calibration is executed, the BF-BB unit 110 controls each of the SWs 128 and releases the connection between the ANTs 125 and the respective RXs 123. The BF-BB unit 110 controls each of the SWs 128, which prevents the UL calibration signal IQ received by each of the RXs 123 from being affected by interference from another system. That is, since the interference component is not included in the UL calibration signal IQ received by each of the RXs 123, the BF-BB unit 110 enables the calibration weight to be applied to each of the RXs 123 to be accurately determined. Further, when the UL calibration is completed, the BF-BB unit 110 controls each of the SWs 128 in such a way that the RXs 123 and the respective ANTs 125 are connected to each other.

Further, when the connection between the ANT 125 and the RX 123 are released, the BF-BB unit 110 sets the signal level of the UL calibration signal to be higher than the general UL calibration signal transmitted when the ANT 125 and the RX 123 are connected to each other. That is, the BF-BB unit 110 sets the signal level of the UL calibration signal to be higher than the signal level of the UL calibration signal in a case in which it is assumed that the UL calibration signal is transmitted in the state in which the ANT 125 and the RX 123 are connected to each other. In other words, the BF-BB unit 110 sets the signal level of the UL calibration signal to be higher than the signal level that exceeds −85 dBm/MHz restricted when the TX is in the OFF state, the signal level being specified in the 3GPP standards.

As described above, when the ANTs 125 and the respective RXs 123 are connected to each other, there is no possibility that the UL calibration signal may leak out from each of the ANTs 125 to the outside. Therefore, the BF-BB unit 110 sets the signal level of the UL calibration signal to be higher than the signal level defined in the 3GPP standards. According to this configuration, the UL calibration signal is able to ensure the SINR higher than that of the general UL calibration signal, whereby the BF-BB unit 110 is able to accurately determine the calibration weight to be applied to each of the RXs 123.

The optical transceiver 121 performs photoelectric conversion and the reverse conversion thereof of the signal transmitted or received between the BF-BB unit 110 and the TRX-BB unit 122.

The TRX-BB unit 122, which is a transmitter/receiver baseband unit, is a main signal reception digital baseband unit. The TRX-BB unit 122 outputs the UL calibration signal IQ (IQ signal) received from the BF-BB unit 110 to the CAL-TX 127.

Further, the TRX-BB unit 122 receives the UL calibration signal IQ (IQ signal) from each of the RXs 123. The TRX-BB unit 122 transmits the received UL calibration signal IQ (IQ signal) to the BF-BB unit 110 via the optical transceiver 121.

The RX 123 corresponds to the receivers 2-1 to 2-N according to the first example embodiment. The RX 123 is a receiver provided so as to correspond to each of the ANTs 125. The RX 123 receives the UL calibration signal (RF signal) from the CAL-TX 127. The RX 123 converts the received UL calibration signal (RF signal) into a UL calibration signal IQ (IQ signal). Then the RX 123 outputs the converted UL calibration signal IQ to the TRX-BB unit 122.

The AMP 124 is a reception amplifier provided so as to correspond to each of the RXs 123 and each of the ANTs 125. The AMP 124 amplifies the UL calibration signal output from the distributor 126 and outputs the amplified signal to the RX 123.

The ANT 125 is an antenna provided so as to correspond to each of the RXs 123. The ANT 125 receives signals from UE that performs communication with the wireless communication apparatus 100. When there is an interference wave from another system, the ANT 125 receives this interference wave.

The distributor 126 distributes the UL calibration signal output from the CAL-TX 127 and outputs the distributed UL calibration signal to each of the RXs 123. In the wireless communication apparatus 100, the distributor 126 may be referred to as a CAL Network.

The CAL-TX 127 corresponds to the calibration transmitter 3 according to the first example embodiment. The CAL-TX 127 is a transmitter that has a transmission function of the calibration transmitter/receiver. The CAL-TX 127 receives the UL calibration signal IQ (IQ signal) output from the TRX-BB unit 122 and converts the received signal into the UL calibration signal (RF signal). The CAL-TX 127 outputs the converted UL calibration signal (RF signal) to the distributor 126.

The SW 128 is a switch that switches the signal direction. The SW 128 is a switch that is provided so as to correspond to each of the ANTs 125 and each of the RXs 123. The SW 128 connects the RXs 123 and the respective ANTs 125 or the RXs 123 and the respective terminators 129. When the SW 128 connects the RXs 123 and the respective ANTs 125, the SW 128 outputs the signal input from each of the ANTs 125 to each of the RXs 123. On the other hand, when the SW 128 connects the RXs 123 and the respective terminators 129, the SW 128 does not output a signal to each of the RXs 123.

The terminator 129 is a terminator that is provided so as to correspond to each of the ANTs 125 and each of the RXs 123.

<Operational Example of Wireless Communication Apparatus>

Figure 6:
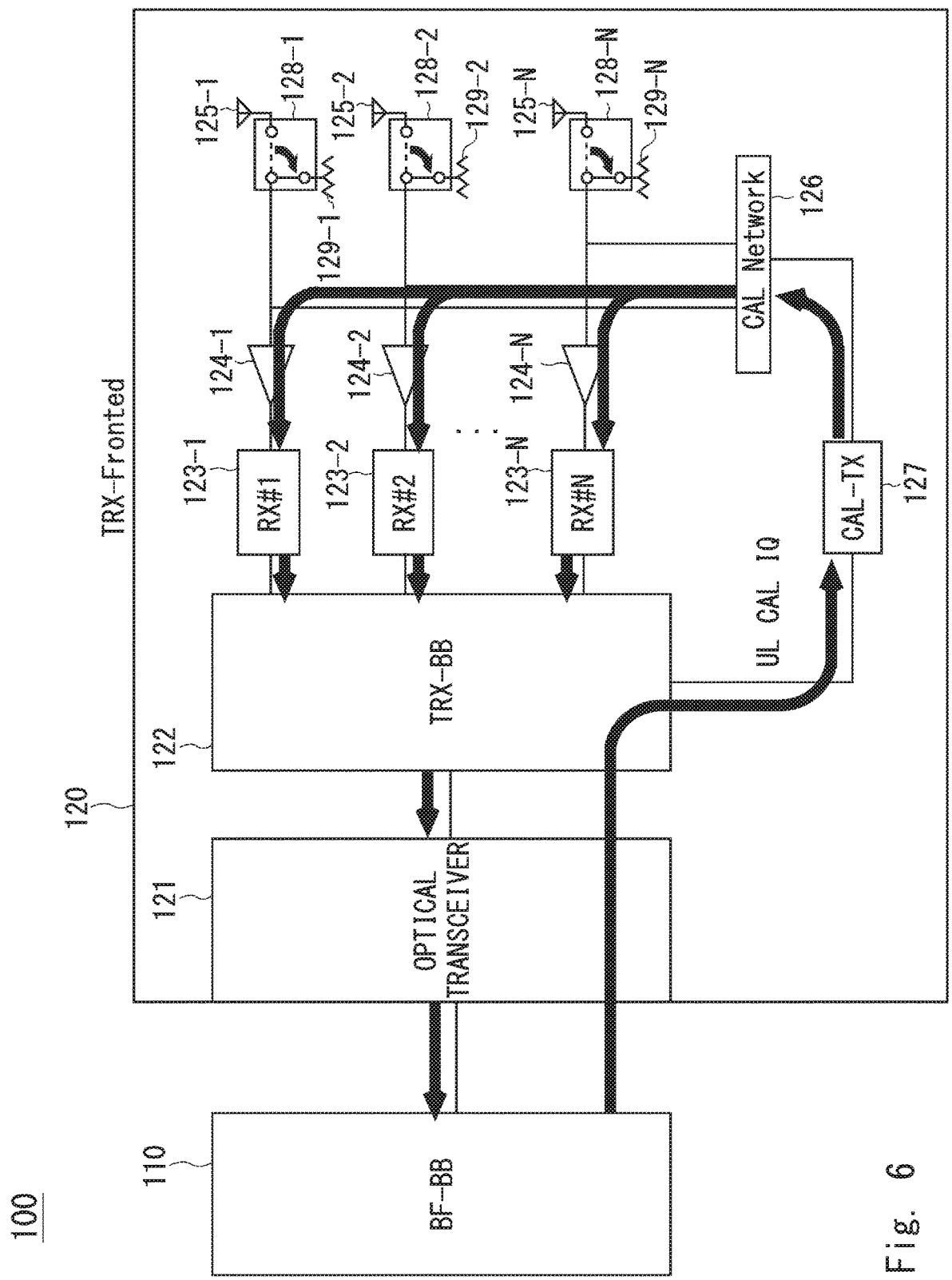
FIG. 6 is a diagram for describing an operational example of the wireless communication apparatus according to the third example embodiment.

Referring next to FIG. 6, an operational example of the wireless communication apparatus 100 according to the third example embodiment will be explained. FIG. 6 is a diagram for describing the operational example of the wireless communication apparatus according to the third example embodiment. Specifically, FIG. 6 is a diagram showing an operational example of the UL calibration operation executed by the wireless communication apparatus 100 according to the third example embodiment.

The wireless communication apparatus 100 executes the DL calibration in the GP of the special subframe between the DL subframe in which the DL communication is performed and the UL subframe in which the UL communication is performed, and then executes the UL calibration.

First, when the BF-BB unit 110 executes the UL calibration, the BF-BB unit 110 switches each of the SWs 128 so as to connect the RXs 123 and the respective terminators 129. That is, when the BF-BB unit 110 executes the UL calibration, the BF-BB unit 110 switches each of the SWs 128 and releases the connection between the RXs 123 and the respective ANTs 125.

Next, the BF-BB unit 110 transmits the UL calibration signal IQ (IQ signal) to the CAL-TX 127 via the optical transceiver 121 and the TRX-BB unit 122. The BF-BB unit 110 sets the signal level of the UL calibration signal IQ (IQ signal) to be transmitted to be higher than the signal level of the UL calibration signal IQ (IQ signal) when it is assumed that this signal is transmitted in the state in which the ANT 125 and the RX 123 are connected to each other.

The CAL-TX 127 converts the received UL calibration signal IQ (IQ signal) into the UL calibration signal (RF signal), and outputs the converted signal to the distributor 126. The distributor 126 distributes the UL calibration signal that has been input, and outputs the distributed signal to each of the RXs 123 via each of the AMPs 124.

Each of the RXs 123 converts the received UL calibration signal (RF signal) into the UL calibration signal IQ (IQ signal). Each of the RXs 123 outputs the converted UL calibration signal IQ (IQ signal) to the BF-BB unit 110 via the TRX-BB unit 122 and the optical transceiver 121.

The BF-BB unit 110 measures the difference between the amplitude and the phase of the UL calibration signal IQ of the UL calibration signal received by each of the RXs 123 and the amplitude and the phase of the UL calibration signal IQ transmitted from the CAL-TX 127. The BF-BB unit 110 then determines the calibration weight to be applied to each of the RXs 123, and the UL calibration operation is thus ended.

In the following normal UL operation, the BF-BB unit 110 applies a weight on the UL signal IQ output from each of the RXs 123 with a calibration weight calculated for the receiver RX.

As described above, when the BF-BB unit 110 executes the UL calibration, the BF-BB unit 110 switches each of the SWs 128 so as to release the connection between the RXs 123 and the respective ANTs 125. Then the BF-BB unit 110 determines the calibration weight to be applied to each of the RXs 123 based on the difference between the amplitude and the phase of the UL calibration signal transmitted from the CAL-TX 127 and the amplitude and the phase of the UL calibration signal received by each of the RXs 123. As described above, since the connection between the RXs 123 and the respective ANTs 125 has been released, the UL calibration signal received from each of the RXs 123 is not affected by interference from another system. That is, the BF-BB unit 110 determines the calibration weight to be applied to each of the RXs 123 based on the UL calibration signal that does not include the interference component. Therefore, according to the wireless communication apparatus 100 in the third example embodiment, it is possible to suppress degradation of the UL calibration signal due to interference from another system. Accordingly, according to the wireless communication apparatus 100 in the third example embodiment, it becomes possible to suppress degradation of the spatial multiplexing performance.

Further, when the connection between the RXs 123 and the respective ANTs 125 has been released, the BF-BB unit 110 sets the signal level of the UL calibration signal to be higher than that of the general UL calibration signal. That is, the BF-BB unit 110 is able to determine the calibration weight to be applied to each of the RXs 123 based on the UL calibration signal having an SINR higher than that of the general UL calibration signal. Accordingly, according to the wireless communication apparatus 100 in the third example embodiment, it becomes possible to accurately determine the calibration weight to be applied to each of the RXs 123.

Then the BF-BB unit 110 performs control to release the connection between the RXs 123 and the respective ANTs 125, whereby it is possible to prevent the UL calibration signal from leaking out from the ANT 125. Accordingly, according to the wireless communication apparatus 100 in the third example embodiment, it becomes possible to accurately determine the calibration weight to be applied to each of the RXs 123 while complying with the prescribed power to be observed when the transmitter TX is in the OFF state.

As described above, according to the wireless communication apparatus 100 in the third example embodiment, it is possible to accurately determine the calibration weight to be applied to each of the RXs 123. Therefore, after the execution of the UL calibration, the amplitude and the phases of all the RXs 123 are uniformly matched. Therefore, by using the wireless communication apparatus 100 according to the third example embodiment, it becomes possible to perform the UL channel estimation with each of the terminals more accurately. Accordingly, according to the third example embodiment, the beamforming pattern for each UE based on the UL channel estimation and the Null generation based on the UL channel estimation at the time of the MU-MIMO operation are also as expected, whereby it can be expected that the spatial multiplexing performance will be improved.
(Modified Example)

While the BF-BB unit 110 is described to perform the UL calibration operation in this example embodiment, the TRX-BB unit 122 may perform the UL calibration operation. That is, the TRX-BB unit 122 may operate as a control unit, determine and store the calibration weight to be applied to each of the RXs 123, generate the UL calibration signal IQ when the UL calibration is executed, and determine the calibration weight to be applied to each of the receivers. In this case, the wireless communication apparatus 100 shown in FIG. 5 may have a configuration in which it does not include the BF-BB unit 110.

Further, the wireless communication apparatus 100 may be configured to further include an SW and a terminator in each of the ANTs 125. According to this configuration, the wireless communication apparatus 100 is able to secure each of the ANTs 125 and the reception period Isolation when the UL calibration is executed.

Fourth Example Embodiment

Next, a fourth example embodiment will be explained. The fourth example embodiment is an example embodiment in which the second example embodiment is described in further detail.
<Configuration Example of Wireless Communication Apparatus>

Figure 7:
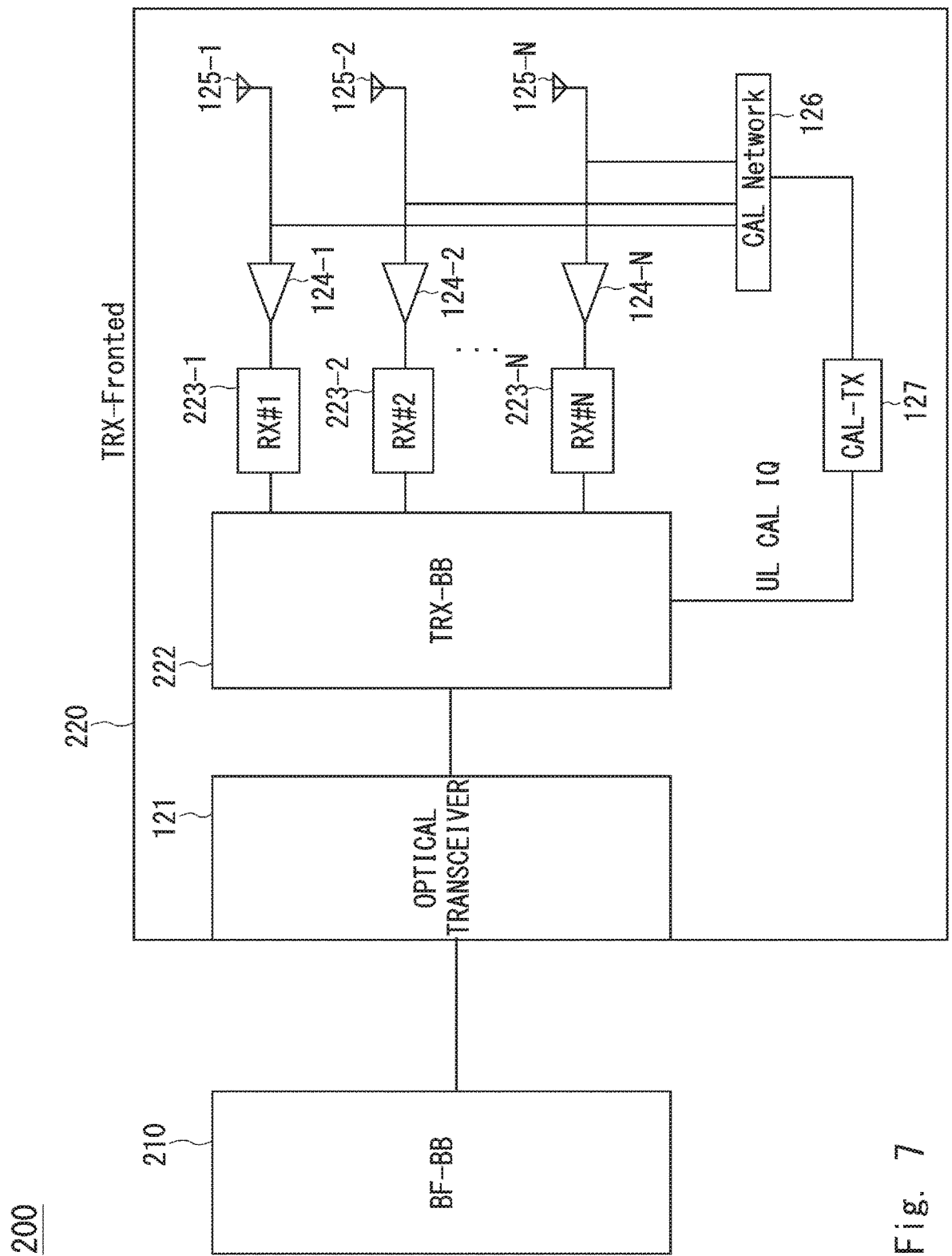
FIG. 7 is a diagram showing a configuration example of a wireless communication apparatus according to a fourth example embodiment.

Reference first to FIG. 7, a wireless communication apparatus 200 according to the fourth example embodiment will be explained. FIG. 7 is a diagram showing a configuration example of the wireless communication apparatus according to the fourth example embodiment. While the wireless communication apparatus 200 according to the fourth example embodiment is different from the wireless communication apparatus 100 according to the third example embodiment in that the wireless communication apparatus 200 does not include the SW 128 and the terminator 129, the other function units in the wireless communication apparatus 200 are the same as those in the wireless communication apparatus 100, and the basic configuration of the wireless communication apparatus 200 is similar to that of the wireless communication apparatus 100. Therefore, among the configurations of the wireless communication apparatus 200 according to the fourth example embodiment, the configurations similar to those in the third example embodiment are denoted by the same reference symbols and descriptions thereof will be omitted as appropriate.

As shown in FIG. 7, the wireless communication apparatus 200 includes a beamforming-baseband (BF-BB) unit 210 and a TRX-frontend unit 220.

The TRX-frontend unit 220 includes an optical transceiver 121, a transmitter/receiver baseband (TRX-BB) unit 222, receivers (RXs) 223-1 to 223-N, and amplifiers (AMPs) 124-1 to 124-N. The TRX-frontend unit 220 further includes antennas (ANTs) 125-1 to 125-N, a distributor 126, and a calibration transmitter (CAL-TX) 127.

In the following description, when there is no need to differentiate the RXs 223-1 to 223-N, the AMPs 124-1 to 124-N, and the ANTs 125-1 to 125-N, they are collectively referred to as an RX 223, an AMP 124, and an ANT 125. While the wireless communication apparatus 200 is described as a configuration that includes only a function unit on a reception side, it may include a function unit on a transmission side.

The BF-BB unit 210 corresponds to the control unit 13 according to the second example embodiment. The BF-BB unit 210 is a baseband unit that has a beamforming signal generation function. The BF-BB unit 210 determines at least one of the calibration weight to be applied to each of the RXs 223 and the UL channel estimation value between each of the ANTs 125 and the plurality of UEs based on the reception signals received by the respective RXs 223. The calibration weight is determined by the UL calibration operation based on the UL calibration signal.

The BF-BB unit 210 determines, periodically and when the wireless communication apparatus 200 has been started, the calibration weight to be applied to each of the RXs 223 (UL CAL Weight) and stores the result of the determination. When the BF-BB unit 210 executes the UL calibration, the BF-BB unit 210 transmits the UL calibration signal IQ to the CAL-TX 127 via the optical transceiver 121 and the TRX-BB unit 222.

The BF-BB unit 210 receives the UL calibration signal IQ from each of the RXs 223. The BF-BB unit 210 measures the difference between the amplitude and the phase of the UL calibration signal IQ transmitted from the CAL-TX 127 and the amplitude and the phase of the UL calibration signal IQ received by each of the RXs 223 and determines the calibration weight to be applied to each of the RXs 223. When the BF-BB unit 210 determines the calibration weight to be applied to each of the RXs 223, the BF-BB unit 210 stores the determined calibration weight for a predetermined period of time.

Further, when the UL channel estimation is executed, the BF-BB unit 210 receives the UL channel estimation signal that indicates a reference signal transmitted from a plurality of UEs (not shown) via the ANT 125, the AMP 124, the RX 223, and the TRX-BB unit 222. The BF-BB unit 210 determines, based on the received UL channel estimation signal, the estimation value of the channel response (UL channel estimation value) for the channel between the ANTs 125 that correspond to the respective RXs 223 and the respective UEs. Upon receiving the UL channel estimation value, the BF-BB unit 210 stores the determined UL channel estimation value for a predetermined period of time.

The TRX-BB unit 222 acquires the quality values of the plurality of reception signals received by the respective RXs 223 and determines whether the transition of the quality value satisfies an interference abnormality condition, thereby determining whether the reception signal is affected by interference from another system, while the details thereof will be described later. Then the TRX-BB unit 222 transmits the result of the determination to the BF-BB unit 210. The plurality of reception signals are reception signals that include at least one of the UL calibration signal and the UL channel estimation signal. The BF-BB unit 210 updates, for the RX 223 in which the transition of the quality value of the reception signal satisfies the interference abnormality condition, the calibration weight and the UL channel estimation value to the calibration weight and the UL channel estimation value determined based on the reception signal received by the RX 223 before the transition of the quality value satisfies the interference abnormality condition based on the result of the determination.

Further, the TRX-BB unit 222 determines, for the RX 223 that satisfies the interference abnormality condition, whether the transition of the quality value of the reception signal satisfies an interference recovery condition based on the transition of the quality value of the reception signal received by this RX 223, and transmits the result of the determination to the BF-BB unit 210. The BF-BB unit 210 inhibits, for the RX 223 in which the interference abnormality condition has been satisfied, processing of determining the calibration weight and the UL channel estimation value until the transition of the quality value of the reception signal received by this RX 223 satisfies the interference recovery condition. The BF-BB unit 210 may continue, for the RX 223 in which the interference abnormality condition has been satisfied, processing of determining the calibration weight and the UL channel estimation value and discard the calibration weight and the UL channel estimation value that have been determined until the transition of the quality value of the reception signal satisfies the interference recovery condition.

On the other hand, the BF-BB unit 210 does not update, for the RX 223 in which the transition of the quality value of the reception signal does not satisfy the interference abnormality condition, the calibration weight to be applied to the RX 223 and the UL channel estimation value between the ANT 125 that corresponds to the RX 223 and the plurality of UEs. That is, the BF-BB unit 210 directly employs the calibration weight and the UL channel estimation value that have been determined.

Further, the TRX-BB unit 222 determines, based on the transition of the quality values of the plurality of reception signals received from the respective RXs 223, whether the transition of the quality value satisfies the RX abnormality condition, thereby determining whether each of the RXs 223 is abnormal. Then the TRX-BB unit 222 transmits the result of the determination to the BF-BB unit 210. The BF-BB unit 210 inhibits, for the RX 223 in which the transition of the quality value of the reception signal satisfies the RX abnormality condition, processing of determining the calibration weight and the UL channel estimation value based on the result of the determination that has been received.

The TRX-BB unit 222 corresponds to the determination unit 12 according to the second example embodiment. The TRX-BB unit 222, which is a transmitter/receiver baseband unit, is a main signal reception digital baseband unit. The TRX-BB unit 222 outputs the UL calibration signal IQ (IQ signal) received from the BF-BB unit 210 to the CAL-TX 127. Further, the TRX-BB unit 222 receives the UL calibration signal IQ (IQ signal) and the UL channel estimation signal from each of the RXs 223. The TRX-BB unit 222 transmits the UL calibration signal IQ (IQ signal) and the UL channel estimation signal IQ (IQ signal) that have been received to the BF-BB unit 110 via the optical transceiver 121.

Further, the TRX-BB unit 222 acquires the quality value of each of the plurality of reception signals received from the respective RXs 223, and determines whether the transition of the quality value satisfies the interference abnormality condition. The plurality of reception signals include at least one of the UL calibration signal and the UL channel estimation signal. Further, the quality value may be, for example, the SINR. In the following description, the quality value is described as the SINR.

Further, the TRX-BB unit 222 determines, for the RX 223 that has received the reception signal in which it has been determined that the transition of the quality value satisfies the interference abnormality condition, whether the transition of the quality value satisfies the interference recovery condition.

Furthermore, the TRX-BB unit 222 determines, for each of the RXs 223, whether the transition of the SINR of the reception signal received from each of the RXs 223 satisfies the RX abnormality condition.

The details of the determination processing performed by the TRX-BB unit 222 will be described later.

The RX 223 corresponds to the receivers 11-1 to 11-N according to the second example embodiment. The RX 223 is a receiver provided so as to correspond to each of the ANTs 125. The RX 223 receives the UL calibration signal (RF signal) from the CAL-TX 127. The RX 223 converts the received UL calibration signal (RF signal) into the UL calibration signal IQ (IQ signal). Then the RX 223 outputs the converted UL calibration signal IQ to the TRX-BB unit 222.

Further, the RX 223 receives the UL channel estimation signal (RF signal) from the ANT 125. The RX 223 converts the received UL channel estimation signal (RF signal) into the UL channel estimation signal IQ (IQ signal). Then the RX 223 outputs the converted UL channel estimation signal IQ to the TRX-BB unit 222.

Since the AMP 124, the ANT 125, the distributor 126, and the CAL-TX 127 are similar to those described in the third example embodiment, the descriptions thereof will be omitted.

<Determination Processing of TRX-BB Unit>

Figure 8:
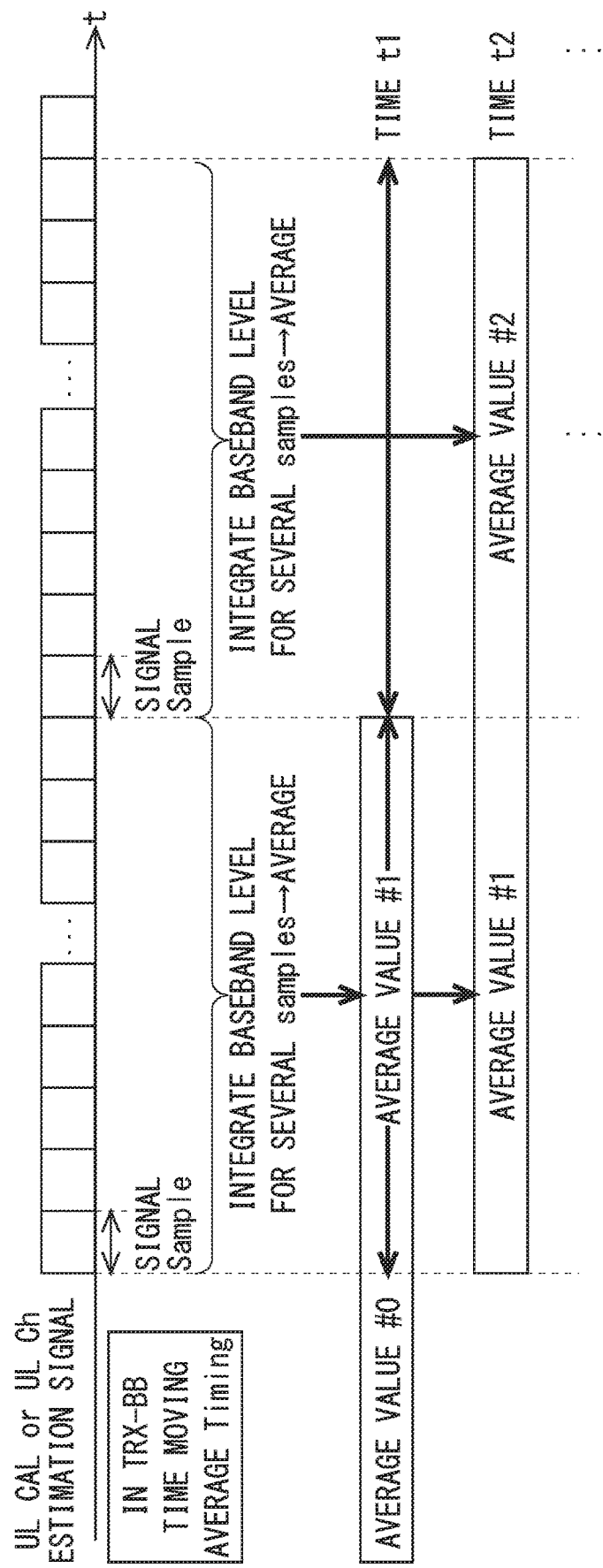
FIG. 8 is a diagram for describing determination processing performed by a TRX-BB unit.

Referring next to FIG. 8, determination processing performed by the TRX-BB unit 222 will be explained. FIG. 8 is a diagram for describing the determination processing performed by the TRX-BB unit. The horizontal axis shown in FIG. 8 is a time axis. FIG. 8 shows the reception status of the reception signal that the TRX-BB unit 222 receives from each of the RXs 223, and explanation of the processing executed by the TRX-BB unit 222 at time t1 and time t2. The respective blocks described along with the time axis in FIG. 8 indicate the reception signals that use the reception signal including the UL calibration signal and the UL channel estimation signal as a signal sample. All the blocks shown in FIG. 8 may indicate the UL channel estimation signal, some of the blocks may indicate the UL calibration signal and the other blocks may indicate the UL channel estimation signal, or all the blocks may indicate the UL calibration signal.

The TRX-BB unit 222 changes, in the UL calibration signal section and the UL channel estimation reception section, the number of integral samples and the number of averaging samples of the reception signal and then moves and updates the average value between the same samples. Specifically, the TRX-BB unit 222 calculates the average value of the SINR of the reception signal received by each of the RXs 223 for each predetermined time section when the UL calibration is performed and the UL channel estimation is performed. Further, the TRX-BB unit 222 calculates the moving average value in each time section.

Specific examples will be given with reference to FIG. 8. At time t1, the TRX-BB unit 222 integrates and averages the baseband level using the reception signal at time t1 as a signal sample, thereby calculating the average value #1 of the SINR of the reception signal. Then the TRX-BB unit 222 calculates the moving average value #1 using the average value #0 of the aforementioned reception signal at time t0 and the average value #1 of the SINR of the aforementioned reception signal.

Next, at time t2, the TRX-BB unit 222 integrates and averages the baseband level using the reception signal at time t2 as a signal sample, thereby calculating the average value #2 of the SINR of the reception signal. Then the TRX-BB unit 222 calculates the moving average value #2 using the average value #1 and the average value #2. The TRX-BB unit 222 calculates the average value and the moving average value also for time t3 and later.

While the moving average value is calculated using the average values in two time sections in the aforementioned description, it is needless to say that the number of time sections based on which the moving average value is calculated is not limited to two and may be a number that can be changed as appropriate. Further, the number of signal samples used to calculate the average value in a predetermined time section may be adaptable.

After the TRX-BB unit 222 calculates the moving average value in each time section as described above, the TRX-BB unit 222 performs each determination processing using the calculated moving average value and the determination threshold. As described above, the TRX-BB unit 222 executes processing for determining whether the transition of the SINR satisfiers the interference abnormality condition (interference abnormality condition determination), processing for determining whether the interference abnormality has recovered (interference recovery condition determination), and processing for determining whether the RX 223 is abnormal (RX abnormality condition determination). In the following description, each determination processing will be explained.

First, interference abnormality condition determination will be explained.

The TRX-BB unit 222 determines, when the calculated moving average value continues to increase by the interference threshold or more in a predetermined number of successive time sections, that the transition of the SINR of the reception signal satisfies the interference abnormality condition. That is, the TRX-BB unit 222 determines that the reception signal of the RX 223 that has received the reception signal in which the transition of the SINR of the reception signal satisfies the interference abnormality condition is affected by interference from another system.

Specifically, the TRX-BB unit 222 determines, when a case in which the differential value obtained by subtracting the moving average value #n-1 from the moving average value #n becomes equal to or larger than the interference threshold continues a predetermined number of successive times, that external reception interference with low correlation with the reception signal occurs from another system. That is, the TRX-BB unit 222 determines that the reception signals received after the time section a predetermined number of times before the time section to be determined are affected by interference from another system.

When the external reception interference from another system occurs, it is assumed that the moving average value increases in a step-wise manner since the interference wave occurs in a burst manner. Therefore, the TRX-BB unit 222 performs interference abnormality condition determination depending on whether the state in which the calculated moving average value increases by the interference threshold or more continues a predetermined number of times. One or more desired number of times are set as the aforementioned predetermined number of times.

The TRX-BB unit 222 determines, for the RX 223 in which it is determined that the transition of the SINR of the reception signal satisfies the interference abnormality condition, that the reception signal is affected by interference from another system until it is determined that the transition of the SINR of the reception signal satisfies the interference recovery condition.

In this case, it can be considered that the reception signals received after the time section a predetermined number of times before the time section to be determined are affected by interference from another system. In this case, the BF-BB unit 210 discards, for the aforementioned RX 223, the calibration weight and the UL channel estimation value determined in the time sections for a predetermined number of times. Then the BF-BB unit 210 updates the calibration weight and the UL channel estimation value to the calibration weight and the UL channel estimation value determined in the time section just before the time section in which the moving average value increases by the interference threshold or more for the aforementioned RX 223. Specifically, the BF-BB unit 210 updates the calibration weight and the UL channel estimation value to the calibration weight and the UL channel estimation value determined in a time section just before the time section a predetermined number of times before the time section to be determined.

Further, the BF-BB unit 210 inhibits, for the aforementioned RX 223, processing of determining the calibration weight and the UL channel estimation value until it is determined that the transition of the SINR of the reception signal satisfies the interference recovery condition. That is, the BF-BB unit 210 does not execute the UL calibration operation and the UL channel estimation operation for the aforementioned RX 223. The BF-BB unit 210 may continue, for the aforementioned RX 223, the processing of determining the calibration weight and the UL channel estimation value and discard the calibration weight and the UL channel estimation value that have been determined until it is determined that the transition of the SINR of the reception signal satisfies the interference recovery condition.

Next, the interference recovery condition determination will be explained.

The TRX-BB unit 222 determines, for the RX 223 in which it is determined that the transition of the SINR of the reception signal satisfies the interference abnormality condition, whether the transition of the SINR of the reception signal satisfies the interference recovery condition. Specifically, the TRX-BB unit 222 determines, when the moving average value after it has been determined that the above transition satisfies the interference abnormality condition and the moving average value before it has been determined that the above transition satisfies the interference abnormality condition are smaller than the interference threshold, that the transition of the SINR of the reception signal satisfies the interference recovery condition. In other words, the TRX-BB unit 222 determines, when the moving average value has gone back to the moving average value before it is determined that the reception signal is affected by interference from another system after it has been determined that the reception signal is affected by interference, that the reception signal is no longer affected by the interference.

When the TRX-BB unit 222 has determined that the transition of the SINR of the reception signal satisfies the interference abnormality recovery condition, the BF-BB unit 210 starts processing of determining the calibration weight and the UL channel estimation value. When the BF-BB unit 210 has continued the processing of determining the calibration weight and the UL channel estimation value in the time section in which the transition of the SINR of the reception signal satisfies the interference abnormality condition, the BF-BB unit 210 uses the calibration weight and the UL channel estimation value that have been determined without discarding them.

Next, the RX abnormality condition determination will be explained.

The TRX-BB unit 222 determines that the transition of the SINR of the reception signal satisfies the RX abnormality condition when the moving average value continues to decrease by an RX gain reduction threshold #1 or more in a predetermined number of successive time sections and at the same time the absolute value of the moving average value becomes equal to or smaller than an RX gain reduction threshold #2.

Specifically, the TRX-BB unit 222 calculates the differential value obtained by subtracting the moving average value #n-1 from the moving average value #n. The TRX-BB unit 222 determines that the transition of the SINR of the reception signal satisfies the RX abnormality condition when a case in which the calculated differential value decreases by the RX gain reduction threshold #1 or more and at the same time the absolute value of the moving average value #n has become equal to or smaller than the RX gain reduction threshold #2 continues a predetermined number of times. Then the TRX-BB unit 222 determines that the RX gain reduction in the RX 223 that has received the reception signal in which it has been determined that the transition of the SINR of the reception signal satisfies the RX abnormality condition is abnormal.

In this case, the BF-BB unit 210 inhibits, for the RX 223 whose RX gain reduction has been determined to be abnormal, processing of determining the calibration weight and the UL channel estimation value. That is, the BF-BB unit 210 does not execute the UL calibration operation and the UL channel estimation operation for the RX 223 that has been determined to be abnormal.

The interference threshold, the RX gain reduction threshold #1, the RX gain reduction threshold #2, and the predetermined number of times may be adjustable in accordance with the property and the condition of the interference signal under the AAS setting environment since the response performance to the instantaneous fluctuation of the interference wave is changed.

<Operational Example of Wireless Communication Apparatus>

Figure 9:
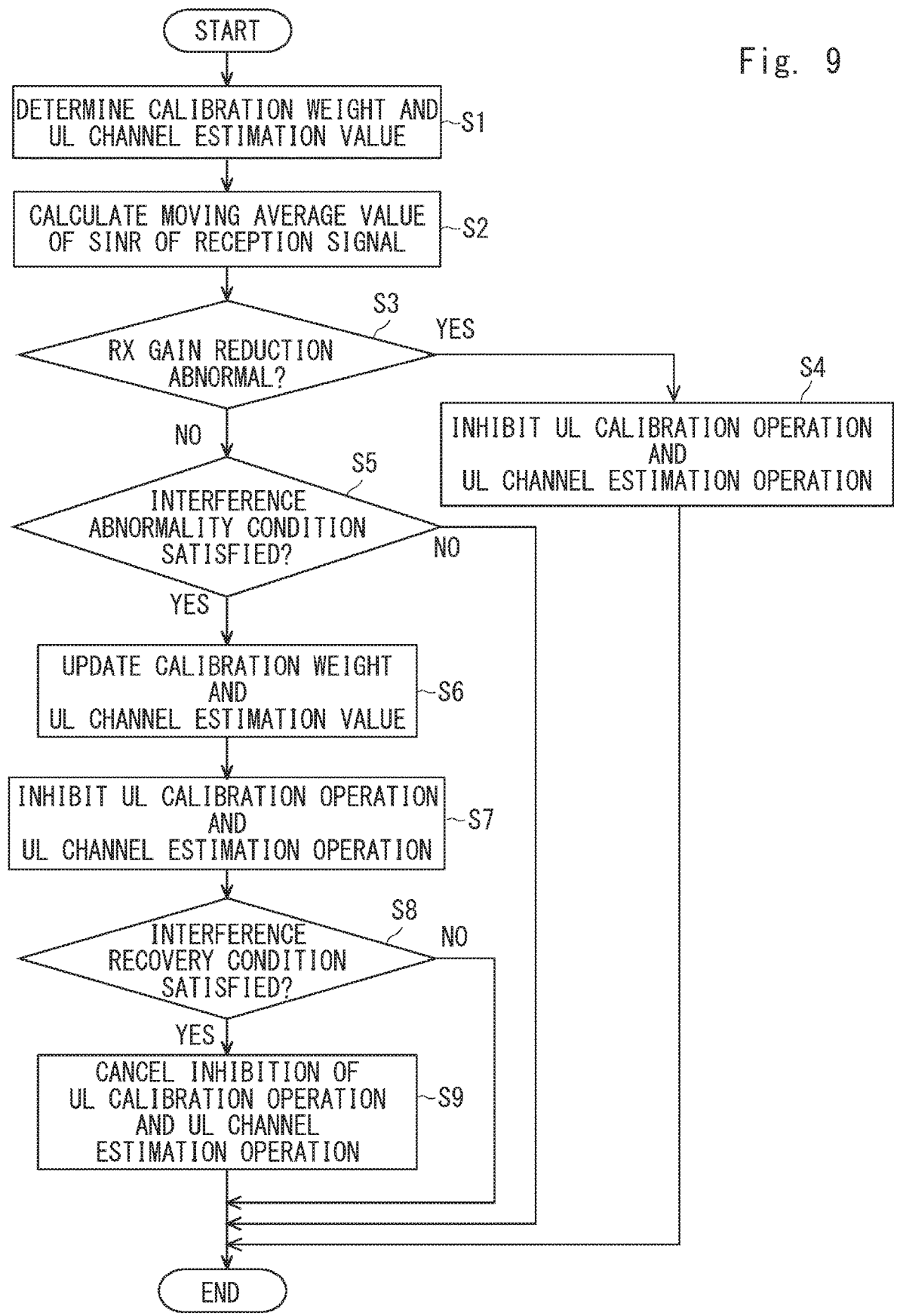
FIG. 9 is a diagram for describing an operational example of the wireless communication apparatus according to the fourth example embodiment.

Referring next to FIG. 9, an operational example of the wireless communication apparatus 200 according to the fourth example embodiment will be explained. FIG. 9 is a diagram for describing an operational example of the wireless communication apparatus according to the fourth example embodiment. FIG. 9 is an operation repeatedly executed in every predetermined time section and executed for each of the RXs 223 in the UL calibration signal section and the UL channel estimation reception section. In other words, the wireless communication apparatus 200 executes the operation shown in FIG. 9 for each of the RXs 223. For convenience of explanation, a description will be given using the RX 223-1.

First, the BF-BB unit 210 determines the calibration weight to be applied to the RX 223-1, and the UL channel estimation value between the ANT 125-1 that corresponds to the RX 223-1 and each of the UEs based on each of the UL calibration signals and each of the UL channel estimation signals (Step S1). Step S1 is repeatedly executed every time the UL calibration operation and the UL channel estimation operation are executed.

Next, the TRX-BB unit 222 calculates the average value and the moving average value of the SINR of the reception signal (Step S2).

Next, the TRX-BB unit 222 determines whether the RX gain reduction in the RX 223-1 is abnormal based on the moving average value calculated in Step S2, the RX gain reduction threshold #1, and the RX gain reduction threshold #2 (Step S3). Specifically, the TRX-BB unit 222 determines whether a case in which the differential value obtained by subtracting the moving average value #n-1 from the moving average value #n decreases by the RX gain reduction threshold #1 or more and at the same time the absolute value of the moving average value #n has become equal to or smaller than the RX gain reduction threshold #2 continues a predetermined number of times.

When the TRX-BB unit 222 has determined that the RX gain reduction in the RX 223-1 is abnormal (YES in Step S3), the BF-BB unit 210 inhibits, for the RX 223-1, the UL calibration operation and the UL channel estimation operation (Step S4). That is, the BF-BB unit 210 inhibits processing of determining the calibration weight to be applied to the RX 223-1 and the UL channel estimation value between the ANT 125-1 and each of the UEs.

On the other hand, when the TRX-BB unit 222 determines that the RX gain reduction in the RX 223-1 is not abnormal (NO in Step S3), the TRX-BB unit 222 determines whether the transition of the SINR of the reception signal received by the RX 223-1 satisfies the interference abnormality condition (Step S5). Specifically, the TRX-BB unit 222 determines whether the differential value obtained by subtracting the moving average value #n-1 from the moving average value #n becomes equal to or larger than the interference threshold a predetermined number of successive times.

When the TRX-BB unit 222 determines that the transition of the SINR of the reception signal received by the RX 223-1 satisfies the interference abnormality condition (YES in Step S5), the BF-BB unit 210 updates the calibration weight and the UL channel estimation value that have been determined (Step S6). Specifically, the BF-BB unit 210 updates the calibration weight and the UL channel estimation value to the calibration weight and the UL channel estimation value determined based on the reception signal received by the RX 223-1 before the transition of the SINR of the reception signal satisfies the interference abnormality condition.

Next, the BF-BB unit 210 inhibits, for the RX 223-1, the UL calibration operation and the UL channel estimation operation (Step S7). That is, the BF-BB unit 210 inhibits processing of determining the calibration weight to be applied to the RX 223-1 and the UL channel estimation value between the ANT 125-1 and each of the UEs.

When the TRX-BB unit 222 determines that the transition of the SINR of the reception signal received by the RX 223-1 satisfies the interference abnormality condition, the TRX-BB unit 222 determines that the reception signal is affected by interference from another system until the transition of the SINR of the reception signal satisfies the interference recovery condition. That is, when the TRX-BB unit 222 determines that the transition of the SINR of the reception signal received by the RX 223-1 satisfies the interference abnormality condition, the process goes to Yes in Step S5 until the transition of the SINR of the reception signal satisfies the interference recovery condition. Note that, in this case, the calibration weight and the UL channel estimation value for the RX 223-1 are the calibration weight and the UL channel estimation value determined based on the reception signal in which it is estimated that it is not affected by interference from another system. Therefore, the processing in Steps S6 and S7 is not executed.

On the other hand, when the TRX-BB unit 222 determines that the transition of the SINR of the reception signal received by the RX 223-1 does not satisfy the interference abnormality condition (NO in Step S5), the processing is ended.

Next, the TRX-BB unit 222 determines whether the transition of the SINR of the reception signal received by the RX 223-1 satisfies the interference recovery condition (Step S8). Specifically, the TRX-BB unit 222 determines whether the moving average value after it has been determined that the above transition satisfies the interference abnormality condition and the moving average value before it has been determined that the above transition satisfies the interference abnormality condition are smaller than the interference threshold.

When the TRX-BB unit 222 determines that the transition of the SINR of the reception signal satisfies the interference recovery condition (YES in Step S8), the BF-BB unit 210 cancels inhibition of, for the RX 223-1, the UL calibration operation and the UL channel estimation operation (Step S9). Specifically, when the TRX-BB unit 222 determines that the moving average value after it has been determined that the above transition satisfies the interference abnormality condition and the moving average value before it has been determined that the above transition satisfies the interference abnormality condition are smaller than the interference threshold, the TRX-BB unit 222 determines that the transition of the SINR of the reception signal satisfies the interference recovery condition. Then the BF-BB unit 210 starts, for the RX 223-1, processing of determining the calibration weight and the UL channel estimation value.

When it is determined that the TRX-BB unit 222 determines that the transition of the SINR of the reception signal received by the RX 223-1 does not satisfy the interference recovery condition (NO in Step S8), the processing is ended.

As described above, the TRX-BB unit 222 calculates, in the UL calibration signal section and the UL channel estimation reception section, the moving average value of the reception signal received by each of the RXs 223 for every predetermined time section. The TRX-BB unit 222 determines whether the transition of the quality value of the reception signal satisfies the interference abnormality condition based on the calculated moving average value. That is, the TRX-BB unit 222 determines whether the reception signal received by each of the RXs 223 is affected by interference. When it is determined that the reception signal is affected by interference, the BF-BB unit 210 updates the calibration weight and the UL channel estimation value to be applied to the corresponding RX 223 to the calibration weight and the UL channel estimation value determined based on the reception signal in which it has been estimated that the reception signal is not affected by interference. That is, when occurrence of the external interference reception has been detected in the UL calibration signal and the UL channel estimation signal, the BF-BB unit 210 does not employ the results of the UL calibration and the UL channel estimation in the time zone around the section where the interference has occurred. Then the BF-BB unit 210 continues to employ the results of the UL calibration measurement and the UL channel estimation before the interference has occurred. The TRX-BB unit 222 performs, when the moving average value of the SINR of the reception signal has gone back to the moving average value before interference, control to recover the UL calibration update operation again, whereby it is possible to prevent MU-MIMO performance from being degraded due to external interference reception in advance. Accordingly, according to the wireless communication apparatus 200 in the fourth example embodiment, the results of the UL calibration and the UL channel estimation executed based on the signal in which it is determined that the interference wave from the external environment does not interfere are employed, whereby it becomes possible to suppress degradation of the spatial multiplexing performance.

Further, the TRX-BB unit 222 determines whether one of the RXs 223 is abnormal using the moving average value of the SINR of the reception signal. The BF-BB unit 210 does not execute the UL calibration operation and the UL channel estimation operation on the RX 223 that has been determined to be abnormal. Therefore, according to the wireless communication apparatus 200 in the fourth example embodiment, the results of the UL calibration execution and the UL channel estimation execution of the RX 223 which is in the abnormal state are not used, whereby it becomes possible to secure a stable AAS performance.

Other Example Embodiments

Figure 10:
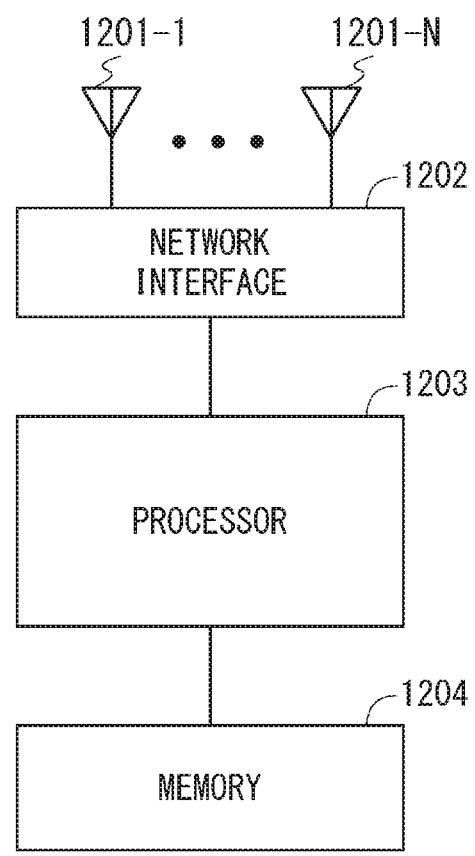
FIG. 10 is a block diagram illustrating a hardware configuration of a computer (information processing apparatus) capable of providing a wireless communication apparatus according to each of the example embodiments.

The wireless communication apparatuses 1, 10, 100, and 200 (hereinafter they are referred to as a wireless communication apparatus 1 and the like) according to the aforementioned example embodiments may have the following hardware configuration. FIG. 10 is a block diagram illustrating a hardware configuration of a computer (information processing apparatus) capable of providing a radio apparatus according to each of the example embodiments.

Referring to FIG. 10, the wireless communication apparatus 1 and the like include a plurality of antennas 1201-1 to 1201-N, a network interface 1202, a processor 1203, and a memory 1204. The plurality of antennas 1201-1 to 1201-N and the network interface 1202 are used to communicate with other wireless communication apparatuses including a plurality of terminals. The network interface 1202 may include, for example, a network interface card (NIC) conforming to IEEE 802.11 series, IEEE 802.3 series or the like.

The processor 1203 loads a software (computer program) from the memory 1204 and executes the loaded software (computer program), thereby performing the processing of the wireless communication apparatus 1 and the like described with reference to the flowchart in the aforementioned example embodiments. The processor 1203 may be, for example, a microprocessor, a Micro Processing Unit (MPU), or a Central Processing Unit (CPU). The processor 1203 may include a plurality of processors.

The memory 1204 is composed of a combination of a volatile memory and a non-volatile memory. The memory 1204 may include a storage located apart from the processor 1203. In this case, the processor 1203 may access the memory 1204 via an I/O interface (not shown).

In the example shown in FIG. 10, the memory 1204 is used to store software modules. The processor 1203 loads these software modules from the memory 1204 and executes the loaded software modules, thereby performing the processing of the wireless communication apparatus 1 and the like described in the aforementioned example embodiments.

As described with reference to FIG. 10, each of the processors included in the wireless communication apparatus 1 and the like executes one or more programs including instructions to cause a computer to perform an algorithm described with reference to the drawings.

According to the aforementioned example embodiments according to the present disclosure, it is possible to provide a wireless communication apparatus and a wireless communication method capable of suppressing degradation of the spatial multiplexing performance.

The programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described embodiments and can be modified as appropriate without departing from the spirit and scope of the present disclosure. Further, the present disclosure may be implemented by combining the above-described embodiments with one another.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary Note 1)

A wireless communication apparatus comprising:

a plurality of receivers provided so as to correspond to a plurality of respective antennas;

a calibration transmitter; and a control unit configured to release, when an Uplink (UL) calibration is executed, connection between the antennas and the respective receivers, and determine a calibration weight to be applied to each of the receivers based on a UL calibration signal transmitted from the calibration transmitter and a UL calibration signal received by each of the receivers.

(Supplementary Note 2)

The wireless communication apparatus according to Supplementary Note 1, further comprising:

a plurality of terminators provided so as to correspond to the plurality of respective receivers; and a plurality of switches configured to connect the receivers and the respective antennas or the receivers and the respective terminators, wherein the control unit switches each of the plurality of switches in such a way as to connect the receivers and the respective terminators and releases the connection between the antennas and the respective receivers.

(Supplementary Note 3)

The wireless communication apparatus according to Supplementary Note 1 or 2, wherein the control unit controls, when the connection between the antennas and the respective receivers is released, the signal level of the UL calibration signal to be higher than the signal level in a case in which it is assumed that the UL calibration signal is transmitted in a state in which the antennas and the respective receivers are connected to each other.

(Supplementary Note 4)

A wireless communication apparatus comprising:

a plurality of receivers;

a determination unit configured to acquire a quality value of each of a plurality of reception signals received by the plurality of respective receivers and determine whether the transition of the quality value satisfies a first condition; and a control unit configured to determine at least one of a calibration weight to be applied to each of the receivers based on reception signals received by the plurality of respective receivers and a UL channel estimation value between antennas that correspond to the respective receivers and a plurality of user equipments, wherein the control unit updates, for a receiver in which the transition of the quality value satisfies the first condition, the calibration weight and the UL channel estimation value to the calibration weight and the UL channel estimation value determined based on the reception signal received by the receiver before the transition of the quality value satisfies the first condition.

(Supplementary Note 5)

The wireless communication apparatus according to Supplementary Note 4, wherein the determination unit calculates, for every predetermined time section, a moving average value of the quality value, and determines whether the transition of the quality value satisfies the first condition based on the calculated moving average value.

(Supplementary Note 6)

The wireless communication apparatus according to Supplementary Note 5, wherein the determination unit determines that the transition of the quality value satisfies the first condition when the moving average value continues to increase by a first threshold or more in a predetermined number of successive time sections, and the control unit updates, for a receiver in which the transition of the quality value satisfies the first condition, the calibration weight and the UL channel estimation value to the calibration weight and the UL channel estimation value determined in a time section just before a time section in which the moving average value continues to increase by the first threshold or more.

(Supplementary Note 7)

The wireless communication apparatus according to any one of Supplementary Notes 4 to 6, wherein the determination unit determines, for the receiver in which the transition of the quality value satisfies the first condition, whether the transition of the quality value of the reception signal received by this receiver satisfies a second condition, and the control unit inhibits processing of determining the calibration weight and the UL channel estimation value for the receiver until the transition of the quality value satisfies the second condition.

(Supplementary Note 8)

The wireless communication apparatus according to Supplementary Note 7, wherein the determination unit calculates, for every predetermined time section, a moving average value of the quality value, and determines that the transition of the quality value satisfies the second condition when the difference between the moving average value after it has been determined that the transition of the quality value satisfies the first condition and the moving average value in a time section before it is determined that the transition of the quality value satisfies the first condition is smaller than a first threshold.

(Supplementary Note 9)

The wireless communication apparatus according to any one of Supplementary Notes 4 to 8, wherein the determination unit determines whether the transition of the quality value satisfies a third condition, and the control unit suppresses processing of determining the calibration weight and the UL channel estimation value for a receiver in which the transition of the quality value satisfies the third condition.

(Supplementary Note 10)

The wireless communication apparatus according to Supplementary Note 9, wherein the determination unit calculates, for every predetermined time section, a moving average value of the quality value, and determines that the transition of the quality value satisfies a third condition when the moving average value continues to decrease by a third threshold or more in a predetermined number of successive time sections and the absolute value of the moving average value becomes equal to or smaller than a fourth threshold.

(Supplementary Note 11)

The wireless communication apparatus according to any one of Supplementary Notes 4 to 10, wherein the plurality of reception signals include at least one of a UL calibration signal and a UL channel estimation signal, and the control unit determines the calibration weight based on the UL calibration signal and determines the UL channel estimation value based on the UL channel estimation signal.

(Supplementary Note 12)

The wireless communication apparatus according to any one of Supplementary Notes 1 to 11, wherein the wireless communication apparatus operates in a Time Division Duplex (TDD) mode, and the calibration weight is determined based on a UL calibration signal transmitted or received in a guard period of a special subframe.

(Supplementary Note 13)

The wireless communication apparatus according to Supplementary Note 12, wherein the UL calibration signal is transmitted or received in a UL calibration execution period after a Downlink (DL) calibration execution period.

(Supplementary Note 14)

A wireless communication method comprising:

releasing, when UL calibration is executed, connection between a plurality of antennas and a plurality of respective receivers provided so as to correspond to the respective antennas; and determining a calibration weight to be applied to each of the receivers based on a UL calibration signal transmitted from a calibration transmitter and a UL calibration signal received by each of the receivers.

(Supplementary Note 15)

A wireless communication method comprising:

acquiring quality values of a plurality of reception signals received by a plurality of respective receivers and determining whether a transition of each of the quality values satisfies a first condition;

determining at least one of a calibration weight to be applied to each of the receivers based on the reception signals received by the plurality of respective receivers and a UL channel estimation value between antennas that correspond to the respective receivers and a plurality of user equipments; and updating, for a receiver in which the transition of the quality value satisfies the first condition, the calibration weight and the UL channel estimation value to the calibration weight and the UL channel estimation value determined based on the reception signal received by the receiver before the transition of the quality value satisfies the first condition.

(Supplementary Note 16)

A non-transitory computer readable medium storing a radio communication program causing a wireless communication apparatus to execute the following processing of:

releasing, when UL calibration is executed, connection between a plurality of antennas and a plurality of respective receivers provided so as to correspond to the respective antennas; and determining a calibration weight to be applied to each of the receivers based on a UL calibration signal transmitted from a calibration transmitter and a UL calibration signal received by each of the receivers.

(Supplementary Note 17)

A non-transitory computer readable medium storing a radio communication program causing a wireless communication apparatus to execute the following processing of:

acquiring quality values of a plurality of reception signals received by a plurality of respective receivers and determining whether a transition of each of the quality values satisfies a first condition;

determining at least one of a calibration weight to be applied to each of the receivers based on the reception signals received by the plurality of respective receivers and a UL channel estimation value between antennas that correspond to the respective receivers and a plurality of user equipments; and updating, for a receiver in which the transition of the quality value satisfies the first condition, the calibration weight and the UL channel estimation value to the calibration weight and the UL channel estimation value determined based on the reception signal received by the receiver before the transition of the quality value satisfies the first condition.

What is claimed is:

1. A wireless communication apparatus comprising:
a plurality of receivers respectively corresponding to a plurality of antennas;
a control unit configured to release, when an Uplink (UL) calibration is executed, respective connection between the antennas and the receivers;
a calibration transmitter to transmit, when the respective connection is released, a UL calibration signal that is received by and passes through each receiver without passing through the antennas, and that results in information being provided to the control unit, each receiver being in an ON state; and
a determination unit to acquire a quality value of each of a plurality of reception signals respectively received by the plurality of receivers, and calculates, for each of a plurality of time sections, a moving average value of the quality value, wherein
the determination unit determines that a transition in time of the quality value satisfies a first condition indicating an abnormal interference level when the moving average value increases by an amount equal to or more than a first threshold in a predetermined number of successive time sections,
the control unit determines at least one of a calibration weight to be applied to each receiver based on the reception signals and a UL channel estimation value between the antennas and a plurality of user equipments, and
the control unit updates, for each receiver in which the transition in time of the quality value satisfies the first condition, the calibration weight and the UL channel estimation value to the calibration weight and the UL channel estimation value determined in the time section immediately before the time section in which the moving average value increased by the amount equal to or more than the first threshold.

2. The wireless communication apparatus according to claim 1, wherein
the determination unit determines, for each receiver in which the transition in time of the quality value satisfies the first condition, whether the transition in time of the quality value satisfies a second condition, and
the control unit does not determine the calibration weight and the UL channel estimation value for the receiver in which the transition in time of the quality value satisfies the first condition but not the second condition until the transition in time of the quality value satisfies the second condition.

3. The wireless communication apparatus according to claim 2, wherein the determination unit determines that the transition of the quality value satisfies the second condition when a difference between the moving average value after the transition in time of the quality value has been determined to satisfy the first condition and the moving average value in the time section before the transition in time of the quality value has been determined to satisfy the first condition is less than a first threshold.

4. The wireless communication apparatus according to claim 1, wherein
the determination unit determines whether the transition in time of the quality value satisfies a third condition, and
the control unit does not determine the calibration weight and the UL channel estimation value for each receiver in which the transition in time of the quality value satisfies the third condition.

5. The wireless communication apparatus according to claim 4, wherein the determination unit determines that the transition in time of the quality value satisfies the third condition when the moving average value decreases by an amount equal to or more than a third threshold in in a predetermined number of successive time sections and an absolute value of the moving average value becomes equal to or less than a fourth threshold.

6. The wireless communication apparatus according to claim 1, wherein
each reception signal include at least one of the UL calibration signal and the UL channel estimation signal, and
the control unit determines the calibration weight based on the UL calibration signal and determines the UL channel estimation value based on the UL channel estimation signal.

* * * * *